United States Patent
Leconte et al.

(10) Patent No.: US 9,874,103 B2
(45) Date of Patent: Jan. 23, 2018

(54) METHOD OF MAKING A METAL REINFORCING MEMBER FOR A BLADE OF A TURBINE ENGINE

(71) Applicant: SNECMA, Paris (FR)

(72) Inventors: Gilbert Michel Marin Leconte, Ozoir la Ferriere (FR); Gilles Charles Casimir Klein, Mery sur Oise (FR); Jean-Michel Patrick Maurice Franchet, Paris (FR); Dominique Magnaudeix, Yerres (FR)

(73) Assignee: SNECMA, Paris (JP)

( * ) Notice: Subject to any disclaimer, the term of this patent is extended or adjusted under 35 U.S.C. 154(b) by 390 days.

(21) Appl. No.: 14/402,182

(22) PCT Filed: May 31, 2013

(86) PCT No.: PCT/FR2013/051238
§ 371 (c)(1),
(2) Date: Nov. 19, 2014

(87) PCT Pub. No.: WO2013/178963
PCT Pub. Date: Dec. 5, 2013

(65) Prior Publication Data
US 2015/0086377 A1 Mar. 26, 2015

(30) Foreign Application Priority Data

Jun. 1, 2012 (FR) ...................................... 12 55103

(51) Int. Cl.
*F01D 5/14* (2006.01)
*F01D 5/28* (2006.01)
(Continued)

(52) U.S. Cl.
CPC ........... *F01D 5/282* (2013.01); *B21D 26/033* (2013.01); *B21D 26/053* (2013.01); *B21D 35/00* (2013.01);
(Continued)

(58) Field of Classification Search
CPC .. B21D 26/055; B23K 15/0053; B23K 15/06; B23K 20/021; B23K 20/18;
(Continued)

(56) References Cited

U.S. PATENT DOCUMENTS 2,615,236 A * 10/1952 Stulen .................... B23K 5/006
228/160
3,936,920 A * 2/1976 Conn, Jr. ........... B23K 11/0093
228/181

(Continued)

FOREIGN PATENT DOCUMENTS

EP 1 450 006 8/2004
FR 2 957 545 9/2011

OTHER PUBLICATIONS

International Search Report dated Jul. 24, 2013 in PCT/FR13/051238 filed May 31, 2013.
U.S. Appl. No. 14/394,366, filed Oct. 14, 2014, Franchet, et a.

*Primary Examiner* — Woody Lee, Jr.
*Assistant Examiner* — Joshua R Beebe
(74) *Attorney, Agent, or Firm* — Oblon, McClelland, Maier & Neustadt, L.L.P.

(57) ABSTRACT

A method of making a metal reinforcing member that is to be mounted on a leading edge or a trailing edge of a composite blade of a turbine engine, the method including: shaping two metal sheets, positioning them on either side of a core including at least one recess that is to form a mold for a spacer for positioning the reinforcing member, assembling them together under a vacuum, conforming them against the (Continued)

core by hot isostatic compression, and cutting them to separate the reinforcing member and release the core.

10 Claims, 2 Drawing Sheets

(51) Int. Cl.

| | | |
|---|---|---|
| B21K 23/00 | (2006.01) | |
| B21D 53/78 | (2006.01) | |
| B21J 5/12 | (2006.01) | |
| B23P 15/04 | (2006.01) | |
| B21K 3/04 | (2006.01) | |
| F04D 29/02 | (2006.01) | |
| F04D 29/32 | (2006.01) | |
| B21D 26/033 | (2011.01) | |
| B21D 26/053 | (2011.01) | |
| B21D 35/00 | (2006.01) | |
| B23K 9/167 | (2006.01) | |
| B23K 20/02 | (2006.01) | |
| B23K 20/233 | (2006.01) | |
| B23K 20/24 | (2006.01) | |
| B23K 101/00 | (2006.01) | |
| B23K 103/14 | (2006.01) | |

(52) U.S. Cl.
CPC ............ *B21D 35/003* (2013.01); *B21D 53/78* (2013.01); *B21J 5/12* (2013.01); *B21K 3/04* (2013.01); *B21K 23/00* (2013.01); *B23K 9/167* (2013.01); *B23K 20/021* (2013.01); *B23K 20/233* (2013.01); *B23K 20/24* (2013.01); *B23P 15/04* (2013.01); *F04D 29/023* (2013.01); *F04D 29/324* (2013.01); *B23K 2201/001* (2013.01); *B23K 2203/14* (2013.01); *F05D 2240/303* (2013.01); *F05D 2300/174* (2013.01); *F05D 2300/603* (2013.01); *F05D 2300/702* (2013.01); *Y02T 50/672* (2013.01); *Y10T 29/49337* (2015.01)

(58) Field of Classification Search
CPC .......... B23K 26/0078; B23K 2201/006; B23K 2201/045; B22K 2203/14; F01D 5/005; F01D 5/147; F04D 2240/303; F04D 2240/304; Y02T 50/672; Y10T 29/49337; Y10T 29/49339; B23P 15/04
See application file for complete search history.

(56) References Cited

U.S. PATENT DOCUMENTS

| | | | | |
|---|---|---|---|---|
| 4,006,999 | A * | 2/1977 | Brantley | F01D 5/282 416/224 |
| 4,010,530 | A * | 3/1977 | Delgrosso | B23K 20/00 228/160 |
| 4,142,888 | A * | 3/1979 | Rozmus | B22F 3/1208 249/105 |
| 4,728,262 | A * | 3/1988 | Marshall | B64C 11/205 416/224 |
| 5,130,084 | A * | 7/1992 | Matheny | B22F 3/1275 419/28 |
| 5,782,607 | A * | 7/1998 | Smith | C25D 7/00 416/224 |
| 5,908,285 | A * | 6/1999 | Graff | C25D 1/10 205/67 |
| 2004/0184921 | A1* | 9/2004 | Schreiber | B23P 15/04 416/229 R |
| 2008/0075601 | A1* | 3/2008 | Giusti | F01D 5/147 416/229 A |
| 2010/0054945 | A1* | 3/2010 | McMillan | F01D 5/282 416/223 A |
| 2011/0010937 | A1* | 1/2011 | Cammer | B21D 53/78 29/889.7 |
| 2011/0033308 | A1* | 2/2011 | Huth | B64C 11/205 416/229 R |
| 2013/0008027 | A1 | 1/2013 | Franchet et al. | |
| 2013/0283586 | A1 | 10/2013 | Franchet et al. | |
| 2013/0294920 | A1 | 11/2013 | Klein et al. | |

\* cited by examiner

METHOD OF MAKING A METAL REINFORCING MEMBER FOR A BLADE OF A TURBINE ENGINE

The present invention relates to a method of making a metal reinforcing member for mounting on the leading edge or the trailing edge of a composite blade for a turbine engine, such as a fan blade for an airplane turboprop or turbojet.

In order to reduce the weight and the cost of turbine engine fan blades, they are generally made of composite material. Fan blades need to be capable of withstanding high levels of stress and of impact because of their speed of rotation and because of impacts against particles or foreign bodies that can penetrate into the air passage. For this purpose, the leading and/or trailing edges of blades made of composite material are protected by metal reinforcing members adhesively bonded onto the airfoils of the blades.

Document EP 1 574 270-A1, in the name of the Applicant, describes a method of making a reinforcing member by diffusion welding and by superplastic forming and diffusion bonding (SPF/DB), which method comprises the steps consisting in:
  welding two metal sheets together by diffusion welding in order to obtain a preform, portions of the sheets being covered in an anti-diffusion substance in order to prevent them being welded together in determined zones;
  curving and twisting the preform;
  inflating the preform so that it is subjected to superplastic forming; and
  cutting the preform so as to obtain the reinforcing member.

That method does not give accurate control over the inside shape of the cavity in the reinforcing member. In particular, the junction zones between the sheets form zones of stress concentration and of break starters, thereby weakening the reinforcing member.

In order to improve the mechanical strength of the reinforcing member, French patent application FR 2 957 545, in the name of the Applicant, proposes a method of making a metal reinforcing member, the method consisting in:
  shaping two metal sheets by die-stamping to approximate the final shape of the reinforcing member that is to be made;
  positioning the two sheets on either side of a core that reproduces the inside shapes of the suction side and of the pressure side of the reinforcing member;
  assembling the two sheets together around the core in leaktight manner and in a vacuum;
  conforming the sheets onto the core by hot isostatic compression; and
  cutting the sheets to separate the reinforcing member and release the core.

The hot isostatic compression of the sheets enables the sheets to be conformed to match the shape of the core and to obtain a large connection radius in the junction zone between the sheets, thereby avoiding any zone of stress concentration or of break starters.

The resulting reinforcing member then includes a first wall for applying against a pressure side surface of the blade and a second wall for applying against a suction side surface of the blade, said walls defining a cavity.

A film of adhesive is then generally placed on the inner surfaces of the cavity, and then two spacers are positioned in the bottom of the cavity at the longitudinal ends of the reinforcing member.

Those spacers are for ensuring that the reinforcing member is properly positioned relative to the leading edge or the trailing edge of the blade.

The reinforcing member is then mounted on the airfoil, with the spacers coming to bear against the leading edge or the trailing edge of the blade.

The assembly is then placed in a stove, so that the adhesive fills the space between the airfoil and the reinforcing member, and polymerizes in such a manner as to fasten the reinforcing member securely on the blade.

The use of the above-mentioned spacers presents numerous drawbacks.

Firstly, the spacers are parts that are independent of the reinforcing member, so it is necessary to manage references for those parts in the logistics of the process. Thereafter, each of the two spacers has its own shape, depending on the zones of the reinforcing member and of the blade in which the spacer is to be positioned. Although they are different, the shapes of the spacers may nevertheless be relatively similar, such that it is possible for an operator to confuse them, thereby running the risk of the spacers being interchanged and thus of the reinforcing member being wrongly positioned on the leading edge or the trailing edge of the blade. There is also a risk that an operator might forget to position one of the two spacers or might lose some of the spacers.

The spacers are also generally positioned at the two ends of the reinforcing member, so that they can be seen from the outside, thereby making it easier to verify that they are present and properly positioned. The positions of the spacers along the reinforcing member therefore cannot be chosen freely.

Finally, those spacers are generally obtained from a linear extrusion. The spacers are therefore straight, and they do not always fit closely to the complex and curved shape of the leading edge or of the trailing edge of the blade.

A particular object of the invention is to avoid those drawbacks in a manner that is simple, effective, and inexpensive.

For this purpose, the invention provides a method of making a metal reinforcing member for mounting on the leading edge or the trailing edge of a composite blade of a turbine engine, the method comprising the steps consisting in:
  shaping two metal sheets to approximate the final shape of the reinforcing member that is to be made;
  positioning the two sheets on either side of a core reproducing the inside shapes of the suction side and of the pressure side of the reinforcing member and including at least one recess for forming a mold for a spacer for positioning the reinforcing member relative to a leading edge or a trailing edge of the blade;
  assembling the two sheets together around the core in leaktight manner and in a vacuum;
  conforming the sheets onto the core by hot isostatic compression; and
  cutting the sheets to separate the reinforcing member and release the core.

The spacer is formed directly together with the reinforcing member, thereby avoiding the use of an additional part and the drawbacks that stem therefrom (managing additional references, risk of loss, risk of being interchanged when there are two or more spacers, . . . ). Also, the shape of the mold, and thus of the spacer, may be chosen freely and can be made to match closely to the curved shape of the corresponding leading edge or trailing edge, if necessary. Finally, the spacer may be located at any position along the reinforcing member, since there is no longer any risk of the spacer being wrongly positioned, so there is no longer any need for it to be visible from the outside.

Preferably, the sheets are made of titanium-based alloy.

Advantageously, the mold of the positioning spacer presents a draft angle for facilitating separation of the reinforcing member from the core.

This avoids degrading the spacer and/or the core while the reinforcing member is being separated from the core.

The invention also provides a single-piece metal reinforcing member obtained by the above-specified method, for mounting on the leading edge or the trailing edge of a composite blade for a turbine engine, the reinforcing member having a first wall for applying against a pressure side surface of the blade and a second wall for applying against the suction side surface of the blade, said walls defining a cavity having a bottom that includes at least one spacer projecting into the cavity and made integrally with said reinforcing member, said spacer being for pressing against a leading edge or a trailing edge of the blade.

According to a characteristic of the invention, the reinforcing member includes at least two spacers that are spaced apart from each other.

According to a possibility of the invention, each of the two spacers is situated in the proximity of one of the longitudinal ends of the reinforcing member, thereby enabling the positioning of the reinforcing member on the leading edge or on the trailing edge of the blade to be improved.

The invention also provides a blade for a turbine engine such as an airplane turboprop or turbojet, the blade comprising an airfoil of composite material having a pressure side surface and a suction side surface that are connected together by a trailing edge and by a leading edge, characterized in that it includes at least one reinforcing member of the above-specified type having its first and second walls adhesively bonded to the pressure side and suction side surfaces of the airfoil, the spacer coming to bear against the leading edge or the trailing edge of the blade.

The leading edge or the trailing edge of the blade on which the reinforcing member is fastened may include at least one chamfered zone, each spacer including a plane end surface that comes to bear against the leading edge or the trailing edge in the corresponding chamfered zone.

Such a characteristic further improves the positioning of the reinforcing member on the leading edge or on the trailing edge of the blade.

Also, the spacer may extend along a straight or curved generator line corresponding to the straight or curved profile of the leading edge or the trailing edge in the zone where the spacer bears against the edge.

The invention can be better understood and other details, characteristics and advantages of the invention appear on reading the following description made by way of nonlimiting example and with reference to the accompanying drawings, in which.

Figure 1:
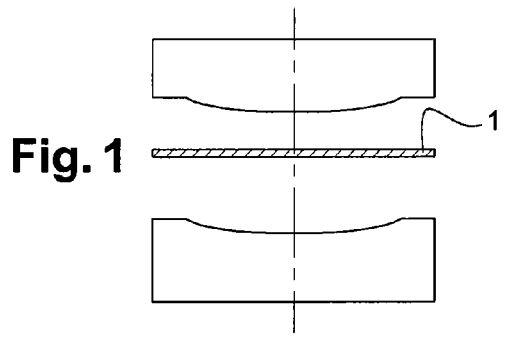
FIGS. 1 and 2 are diagrammatic views of the sheet metal shaping step of the method of the invention.
Figure 2:
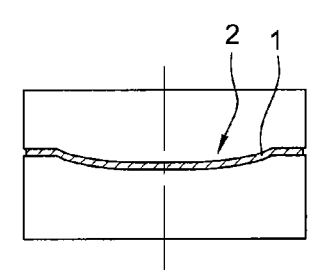

FIG. 1 shows a step of hot stamping metal sheets 1 in order to bring them to a shape close to the final shape of the reinforcing member that is to be made. At the end of this shaping operation, each metal sheet 1 has a concave zone 2 defining a hollow. The sheets 1 are made of titanium-based alloy, e.g. of TA6V. The shaping step is performed at a temperature of about 940° C.

Figure 3:
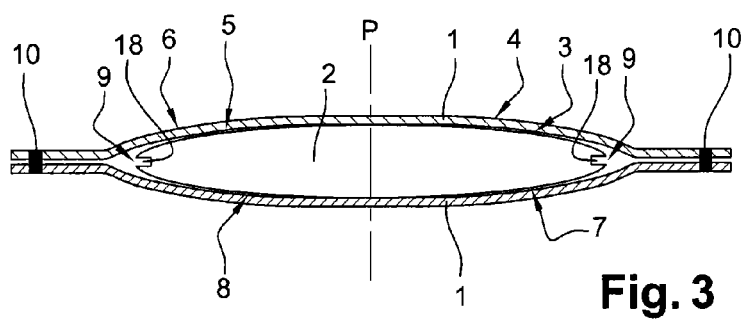
FIG. 3 is a diagrammatic view of the step of assembling metal sheets around the core.
Figure 4:
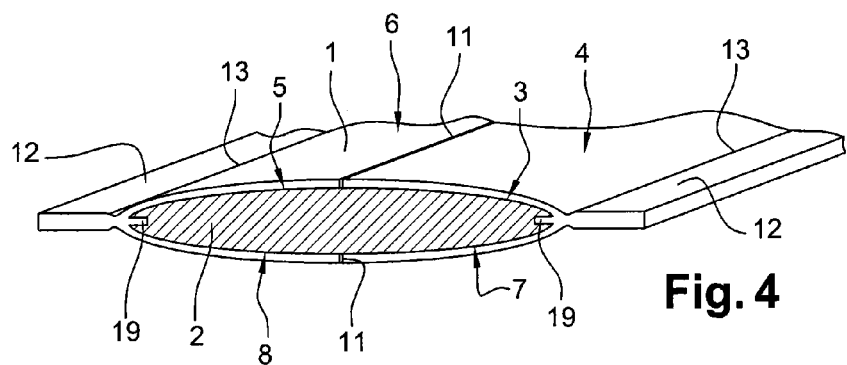
FIG. 4 is a diagrammatic view of the step of conforming metal sheets on the core by hot isostatic compression, and the step of cutting the sheets to separate the reinforcing member and release the core.

As shown in FIG. 3, two identical metal sheets 1 are then placed facing each other on either side of a core 2, the concave sides of the sheets 1 each housing a respective portion of the core 2.

The core 2 presents a plane of symmetry P perpendicular to the sheets and it includes a first face reproducing, for one half 3, the inside shape of the pressure side of a first reinforcing member 4 that is to be made, and for another half 5, the inside shape of the suction side of a second reinforcing member 6 that is to be made. The core 2 also includes a second face, opposite from the first face, and reproducing, for one half 7, the inside shape of the suction side of the first reinforcing member 4, and for another half 8, the inside shape of the pressure side of the second reinforcing member 6.

The connection zones 9 between the two faces, i.e. the lateral faces of the core 2, have a radius of curvature lying in the range 2 millimeters (mm) to 6 mm.

In each connection zone 9, the core 2 also includes two recesses, each for the purpose of forming a mold 18.

Each mold 18 has a plane end surface and side walls presenting draft angles that are sufficient, e.g. lying in the range 4° to 20°.

The molds 18 are situated at the longitudinal ends of the core 2. The molds 18 may also be located at equal distances from each of the ends of the metal reinforcing member, for example each may have a length lying in the range 10 mm to 25 mm, a width lying in the range 2 mm to the total width of the cavity at the location where the mold 18 is located, and a depth lying in the range 1 mm to 8 mm. The number of molds may lie in the range 2 to 10, and the molds are preferably regularly distributed along the metal reinforcing member.

The core 2 is made of a refractory material into which titanium does not diffuse, and out of a metal alloy that may present a coefficient of expansion that is different from that of the metal sheets 1 made of titanium, for example out of IN100.

The purpose is to avoid any adhesion between the metal sheets 1 and the core 2 during the various operations that are performed, in particular during the operation of hot isostatic compression.

Also for this purpose, core 2 may be passivated by being covered in an anti-diffusion barrier that is not contaminating for the metal material of the sheets, which barrier may be obtained either by depositing an oxide, e.g. yttrium oxide, or by forming an oxidation layer by heat treatment. The extra thicknesses are thus formed directly with the metal sheets by creep of the material creeping while it is being conformed.

Previously, the faces of the core 2 may be treated or machined so as to present determined roughness, e.g. roughness Ra greater than 3 µm, preferably lying in the range 3.2 micrometers (μm) to 6.4 μm, as is known from French patent application FR 11/50532, filed by the Applicant and not yet published.

The roughness of the outer surface of the core 2 may be obtained by milling, by shot blasting, by sand blasting, by laser machining, by electro-corrosion, and/or by chemical machining.

If necessary, the outer surface of the core 2 may include zones of different roughnesses.

Once the metal sheets 1 have been put into place around the core 2, they are assembled together at their peripheries by tacking (not shown in the figures) and by tungsten inert gas (TIG) welding in order to be bonded together and held in position. The assembly is then placed in an evacuated enclosure in order to weld the sheets 1 together in the enclosure all around the periphery, e.g. by electron beam welding (EBW). The continuous peripheral weld bead 10 serves to seal the cavity formed between the metal sheets 1.

As shown in FIG. 3, the metal sheets 1 are then conformed on the core 2 by hot isostatic compression during which the sheets 1 are subjected to an external pressure of about 1000 bars and to a temperature of about 940° C., for a duration of about three hours, assuming that the sheets 1 are made of TA6V titanium alloy.

During this operation, the sheets 1 deform so as to be conformed to the core 2 (i.e. made to fit closely to the shape of the core), including in the connection zones 9 of the core 2. In these particular zones, the sheets 1 are joined together while fitting closely to the rounded shape of the core 2.

Also, during this operation, the sheets 1 deform in such a manner as to be conformed to the shape of each mold 18.

The sheets 1 may include extra thicknesses in the zones that are designed to be conformed to the molds.

Also during this step, the roughness of the core 2 is transferred or "printed" on the inner surfaces of the sheets 1 in contact with the rough core 2, as is known from above-mentioned French patent application FR 11/50532.

Simultaneously, because of the high temperature, the two metal sheets 1 are welded together by diffusion welding.

The two reinforcing members 4, 6 are then separated by cutting the sheets 1 apart along lines 11 situated at the intersections between said sheets and the plane of symmetry P.

Excess peripheral material 12 is removed by cutting along trimming lines 13. Finally, finishing machining serves to impart the desired outside shape to the reinforcing members 4, 6.

Figure 5:
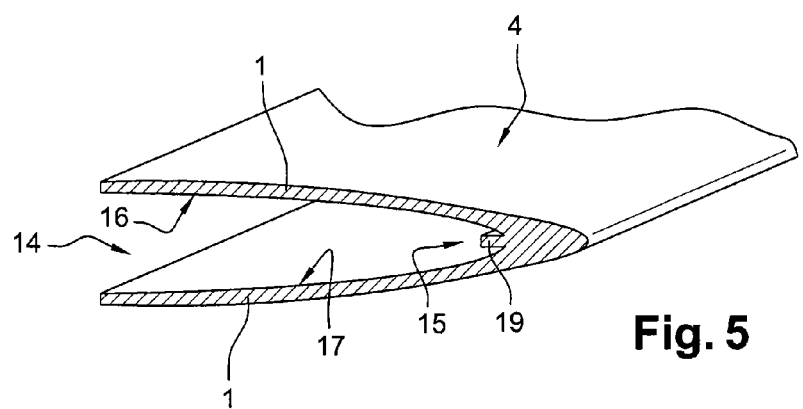
FIG. 5 is a perspective view of a portion of the reinforcing member obtained by performing the method of the invention.

Two reinforcing members are thus obtained, each presenting a shape as shown in FIG. 5, with the junction between the two metal sheets 1, as provided by diffusion welding, ensuring that mechanical characteristics are equivalent to the characteristics of a single-piece member. The cavity 14 in each reinforcing member also includes, in the junction zone 15 between the pressure side 16 and the suction side 17, a radius of curvature that is large enough to avoid generating stress concentrations and cracking in use.

Figure 6:
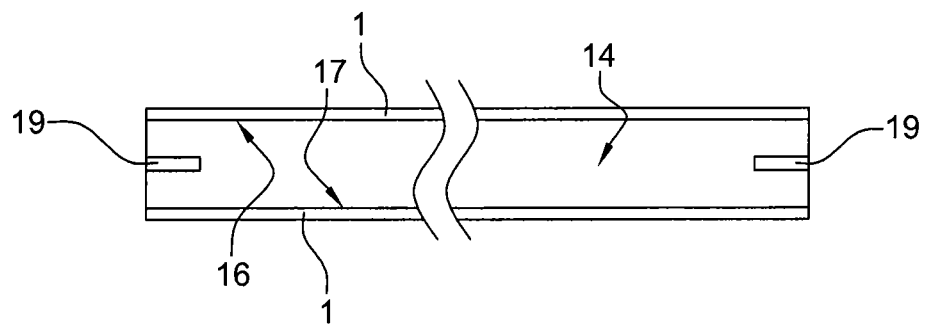
FIG. 6 is a diagrammatic plan view of a reinforcing member of the invention.
Figure 7:
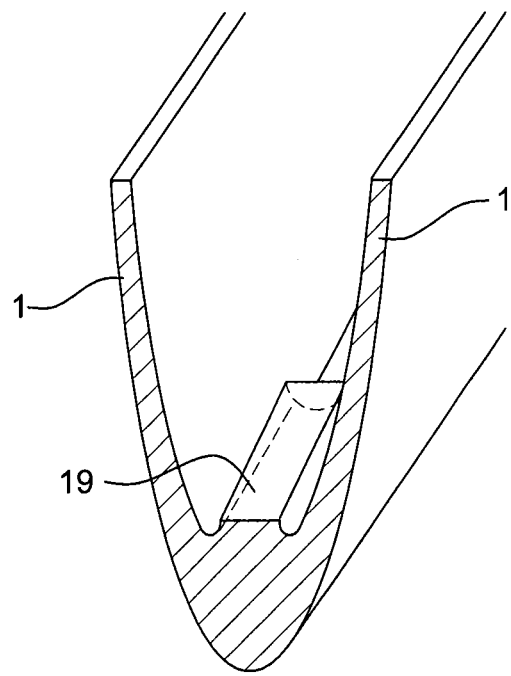
FIG. 7 is a perspective view of a portion of the FIG. 6 reinforcing member.

Furthermore, each reinforcing member includes two spacers 19, formed by the metal sheets being conformed to the molds 18. In this embodiment, the two spacers 19 are situated at the longitudinal ends of a reinforcing member, as can be seen more clearly in FIGS. 6 and 7. Naturally, the spacers 19 could be positioned differently.

The inner surfaces 16, 17 of the cavity 14 present sufficient roughness to enable the reinforcing member 4, 6 to be adhesively bonded onto a leading edge or a trailing edge of a blade made of composite material, e.g. with the help of an epoxy type adhesive.

As for the core 2, it can be reused for making other reinforcing members.

Naturally, the two metal sheets 1 could be used to form only one reinforcing member, instead of two as in the above-described embodiment. Also, the roughness of each reinforcing member 4, 6 may be provided not by transferring roughness from the core 2 to the sheets 1, but for example by subsequent machining of the surfaces in question.

Figure 8:
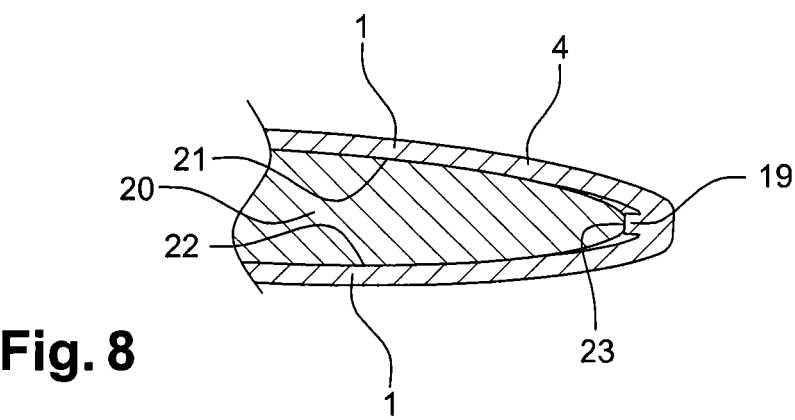
FIG. 8 is a diagrammatic section view showing the reinforcing member being mounted on the leading edge of a blade.

FIG. 8 shows a reinforcing member 4 mounted on a blade comprising an airfoil 20 made of composite material having a pressure side surface 21 and a suction side surface 22 that are connected together by a trailing edge and by a leading edge 23.

It is assumed below that the reinforcing member 4 is mounted on the leading edge 23 of the blade.

In known manner, a film of adhesive may be deposited in the bottom of the cavity 14 and/or on the pressure side and suction side walls 16 and 17 of the cavity 14 prior to mounting the reinforcing member 4 on the airfoil 20.

While the reinforcing member 4 is being mounted, the plane end surface of each spacer 19 comes to bear against a plane zone of the leading edge 23 that is obtained by chamfering the leading edge 23.

The assembly is then placed inside a pouch that is evacuated and put into a stove, at a temperature of about 120° C. and for a period of about two hours, so that the adhesive fills the empty space between the airfoil 20 and the reinforcing member 4 and polymerizes in such a manner as to ensure that the reinforcing member 4 is securely fastened on the blade.

The invention claimed is:

1. A method of making a metal reinforcing member for mounting on a leading edge or a trailing edge of a composite blade of a turbine engine, the method comprising:
    shaping two metal sheets to approximate a final shape of the reinforcing member that is to be made;
    positioning the two sheets on either side of a core reproducing inside shapes of a suction side and of a pressure side of the reinforcing member and including at least one recess for forming a mold for a spacer for positioning the reinforcing member relative to the leading edge or the trailing edge of the blade;
    assembling the two sheets together around the core in a leaktight manner and in a vacuum;
    conforming the sheets onto the core by hot isostatic compression; and
    cutting the sheets to separate the reinforcing member and release the core.

2. A method according to claim 1, wherein the sheets are made of titanium-based alloy.

3. A method according to claim 1, wherein the mold of the positioning spacer presents a draft angle for facilitating separation of the reinforcing member from the core.

4. A single-piece metal reinforcing member made by the method of claim 1, for mounting on a leading edge or a trailing edge of a composite blade for a turbine engine, the reinforcing member comprising:
    a first wall for applying against a pressure side surface of the blade and a second wall for applying against a suction side surface of the blade,
    the first and second walls defining a cavity having a bottom that includes a spacer projecting into the cavity and made integrally with the reinforcing member,
    the spacer being for pressing against the leading edge or the trailing edge of the blade.

5. A single-piece metal reinforcing member for mounting on a leading edge or a trailing edge of a composite blade for a turbine engine, the reinforcing member comprising:
- a first wall for applying against a pressure side surface of the blade and a second wall for applying against a suction side surface of the blade,
- the first and second walls defining a cavity having a bottom that includes a spacer projecting into the cavity, a first end of the spacer being made integrally with the reinforcing member,
- the spacer being for pressing against the leading edge or the trailing edge of the blade,
- wherein said spacer has a second planar end projecting into said cavity and being free of contact with the first and second walls, and
- wherein the first wall, the second wall, and the spacer are diffusion welded to each other.

6. A metal reinforcing member according to claim 5, comprising at least two spacers that are spaced apart from each other, each spacer having a second planar end projecting into said cavity and being free of contact with the first and second walls.

7. A metal reinforcing member according to claim 6, wherein each of the two spacers is situated in proximity of one of longitudinal ends of the reinforcing member.

8. A blade for a turbine engine or an airplane turboprop or turbojet, the blade comprising:
- an airfoil of composite material including a pressure side surface and a suction side surface that are connected together by a trailing edge and by a leading edge;
- at least one reinforcing member according to claim 5, having its first and second walls adhesively bonded to the pressure side and suction side surfaces of the airfoil;
- the spacer coming to bear against the leading edge or the trailing edge of the blade.

9. A turbine engine blade according to claim 8, wherein the leading edge or the trailing edge of the blade on which the reinforcing member is fastened includes at least one chamfered zone, each spacer including a plane end surface that comes to bear against the leading edge or the trailing edge in the corresponding chamfered zone.

10. A turbine engine blade according to claim 8, wherein the spacer extends along a straight or curved generator line corresponding to a straight or curved profile of the leading edge or the trailing edge in the zone where the spacer bears against the edge.

* * * * *